United States Patent [19]

Niewold

[11] Patent Number: 4,742,938
[45] Date of Patent: May 10, 1988

[54] GRAVITY BOX AND AUGER POSITIONING MECHANISM

[76] Inventor: D. Wayne Niewold, 149 N. Market St., Paxton, Ill. 60957

[21] Appl. No.: 876,280

[22] Filed: Jun. 19, 1986

[51] Int. Cl.⁴ .............................................. B65G 33/14
[52] U.S. Cl. ...................................... 222/381; 198/315; 222/413; 222/536; 414/505; 414/523
[58] Field of Search ............... 222/526, 533, 530, 536, 222/608–610, 612, 413, 321, 381, 383, 328; 198/300, 313, 320, 632, 671, 312, 315, 316.1, 317–319; 137/615; 414/503–505, 519, 520, 523, 526, 527, 528; 239/166–168, 664, 689; 193/4, 5, 16, 17

[56] References Cited

U.S. PATENT DOCUMENTS

| | | | |
|---|---|---|---|
| 1,524,334 | 1/1925 | Brown | 193/16 |
| 2,417,111 | 3/1947 | Jeoffroy | 414/505 X |
| 3,090,515 | 5/1963 | Crowther | 414/505 |
| 3,265,253 | 8/1966 | Niewold | 222/536 X |
| 3,391,812 | 7/1968 | Heider | 414/505 |
| 3,539,067 | 11/1970 | Secrist et al. | 414/503 X |
| 3,995,754 | 12/1976 | De Koning | 414/523 |

Primary Examiner—Kevin P. Shaver
Attorney, Agent, or Firm—Lockwood, Alex, FitzGibbon & Cummings

[57] ABSTRACT

The present invention relates to a positioning mechanism for a gravity box auger in which the auger is hydraulically swung between its transport and working positions. The positioning mechanism includes a telescopic support arm for supporting the auger at an elevation angle relative to the gravity box and the support arm is coupled to the gravity box and the auger by swivelable couplings which permit swivelable movement of the support arm relative to both the gravity box and the auger as it is being moved between its working and transport positions.

18 Claims, 2 Drawing Sheets

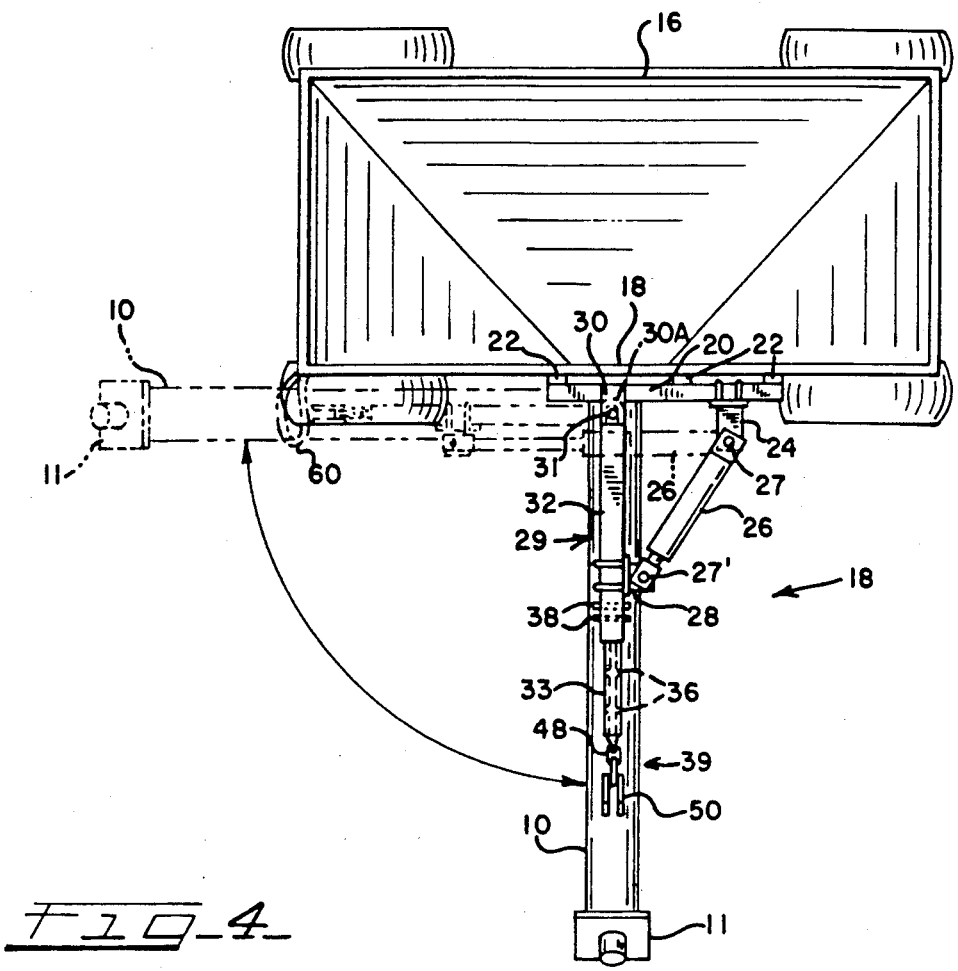
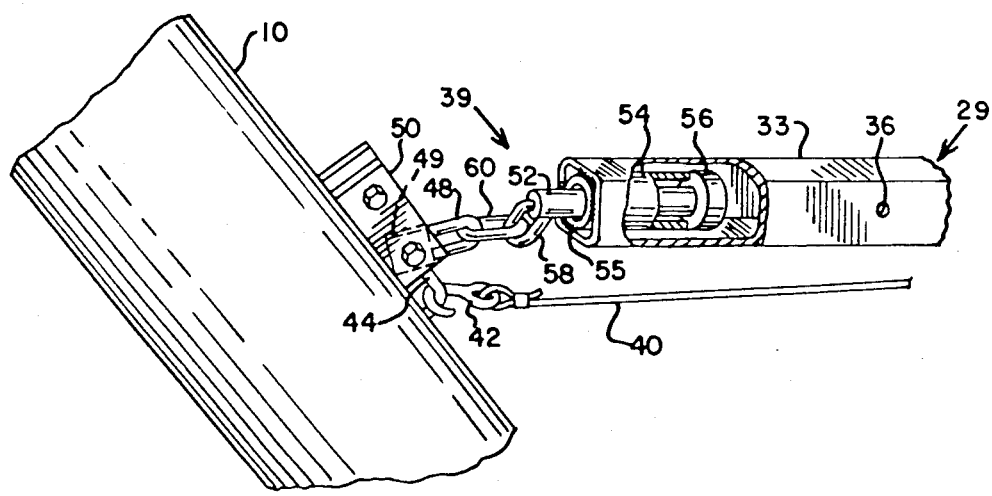

GRAVITY BOX AND AUGER POSITIONING MECHANISM

BACKGROUND AND SUMMARY OF INVENTION

The present invention relates to a positioning mechanism for a gravity box auger and, more particularly, to a positioning mechanism for hydraulically moving the auger between its transport and working positions.

Gravity boxes and grain carts have been utilized for transporting and handling of seed, feed, fertilizer, grain and other free-flowing particulate materials. Such gravity boxes in general have sloping bottom walls defining a hopper to ensure discharge of the entire contents of the box by gravity through a discharge chute positioned at the bottom of the gravity box. An auger-hopper assembly is frequently attached at the discharge chute, such as is shown by way of example in my U.S. Pat. No. 3,265,253. The auger as shown in that patent is capable of being pivoted through an arc in a vertical plane perpendicular to the gravity box and can also swing into a stored transport position generally parallel to the side of the gravity box. Auger-hopper constructions such as disclosed in my aforementioned patent in the past have generally been of relatively light weight so that the positioning and movement to and from the transport position can easily be performed manually.

Larger diameter augers of as much as 12 inches in diameter have become available which are capable of moving greater volumes of materials at a higher rates. Because of their larger diameters and their larger drive motors, however, they are substantially heavier and more difficult to position by hand. Because of this, these larger augers generally are either stationarily mounted or consist of hinged sections wherein the auger tube is broken along its length for positioning in its transport position. When in its transport position, the two broken sections of the auger tube are generally perpendicular to each other and, in some cases, the sections may be moved hydraulically between the broken and unbroken positions.

I heretofore have not been aware of any such large diameter gravity box augers in which the auger was swingable as in my aforementioned patent between its transport and working positions by hydraulic, as opposed to manual, manipulation. The ability to swing augers of such large sizes without the need to break and fold them as in the prior augers would be advantageous from the standpoint of speed, as well as ease, and the cost of the auger would be reduced because both the tube and the auger within the tube may be of one piece construction. The auger positioning mechanism of the present invention permits such swinging auger motion between its transport and working positions and this may be accomplished hydraulically. Moreover, the auger positioning mechanism of the present invention has the advantage that it may be mounted to a wide range of already pre-existing gravity boxes or grain carts. Furthermore, in the auger positioning mechanism of the present invention, the auger is capable of pivotal movement in a vertical plane perpendicular to the gravity box wall to enable adjustment of its elevation angle, in addition to the ability to be readily swung hydraulically to its transport position without the need to disassemble parts.

In one principal aspect of the present invention, an auger positioning mechanism for swinging a material conveying auger between two positions, includes mounting means for mounting the auger to a material storage container to permit both pivotal and swivelable movement of the auger relative to the container. The mechanism also includes support means for supporting the auger at an elevation angle relative to the container in one of the two positions, and powered urging means pivotally coupled between the container and the elongate member for moving the auger between the two positions. The support means comprises an elongate member, and first and second coupling means swivelably coupling the elongate member to the container and the auger respectively. The first and second coupling means permit swivelable movement of the elongate member relative to both the container and the auger as the auger is moved between the two positions.

In another principal aspect of the present invention, the last mentioned mechanism includes the container in combination therewith, the container comprising a gravity box.

In still another principal aspect of the present invention, the powered urging means of the above mentioned mechanisms comprises a hydraulic cylinder.

In still another principal aspect of the present invention, the elongate member of the aforementioned mechanisms includes means for varying the length of the member.

In still another principal aspect of the present invention, the elongate member of the aforementioned mechanisms comprises a pair of sections which are telescopically positioned relative to each other to vary the length of the elongate member.

In still another principal aspect of the present invention, the aforementioned mechanisms include elevation adjustment means for adjusting the elevation angle of the auger when the auger is in one of the two positions.

In still another principal aspect of the present invention, the first coupling means of the aforementioned mechanisms comprises eye means on one end of the elongate member and pin means on the container extending through the eye means to permit swivelable movement of the elongate member relative to the container.

In still another principal aspect of the present invention, the second coupling means of the aforementioned mechanisms comprises means rotatable relative to the elongate member, and link means coupling the rotatable means to the auger, the rotatable means and link means permitting swivelable movement of the elongate member relative to the auger.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 2 is a plan view of the gravity box and auger positioning mechanism substantially as shown in FIG. 1;

FIG. 4 is an enlarged, partially broken view of the auger positioning mechanism as viewed substantially within circle 4 of FIG. 3.

DESCRIPTION OF THE PREFERRED EMBODIMENT

Figure 3:
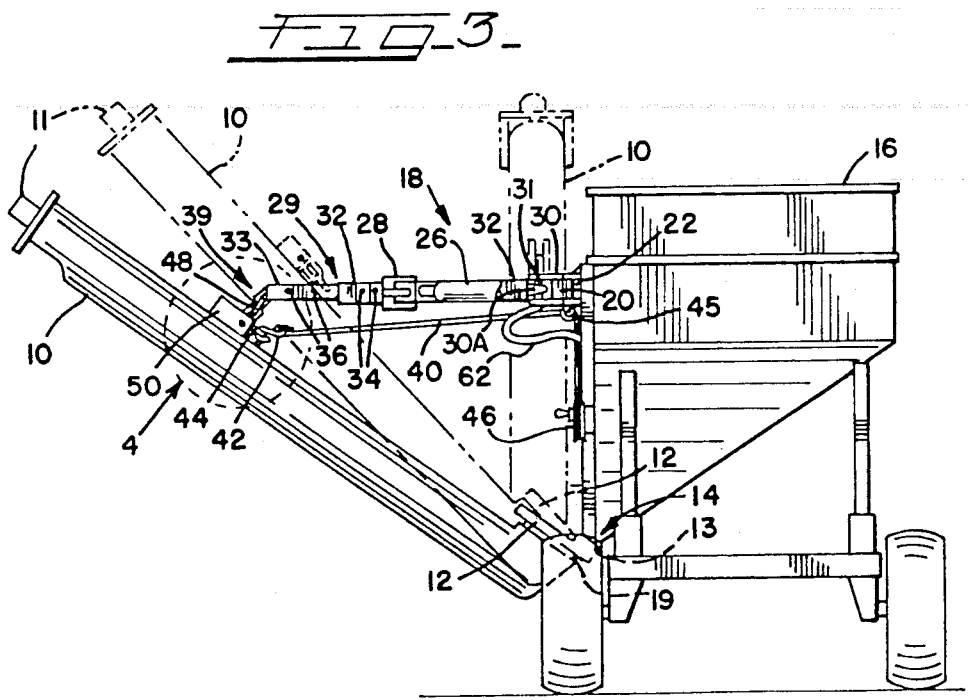
FIG. 3 is an end elevation view of the gravity box and auger positioning mechanism substantially as shown in FIG. 1.

In the preferred embodiment of the present invention, an auger tube 10 having a discharge head 11 and hopper 12 are pivotally supported at 13 at the discharge chute 14, as viewed in FIG. 3, of a gravity box 16. The gravity box 16 is one which preferably transports free-flowing material such as, for example, grain. The materials are discharged from the discharge chute 14 of gravity box 16, into hopper 12 and from there are conveyed from hopper 12 by a rotatable auger (not shown) located within auger tube 10. The auger-hopper construction thus far described is structurally similar to that which is disclosed in my U.S. Pat. No. 3,265,253, the details of which are hereby incorporated by reference. By virtue of the auger-hopper construction thus far described, the hopper 12 and its auger tube 10 are capable of being pivoted in a vertical plane perpendicular to the gravity box as shown by the solid and dot and dash lines in FIG. 3.

Figure 1:
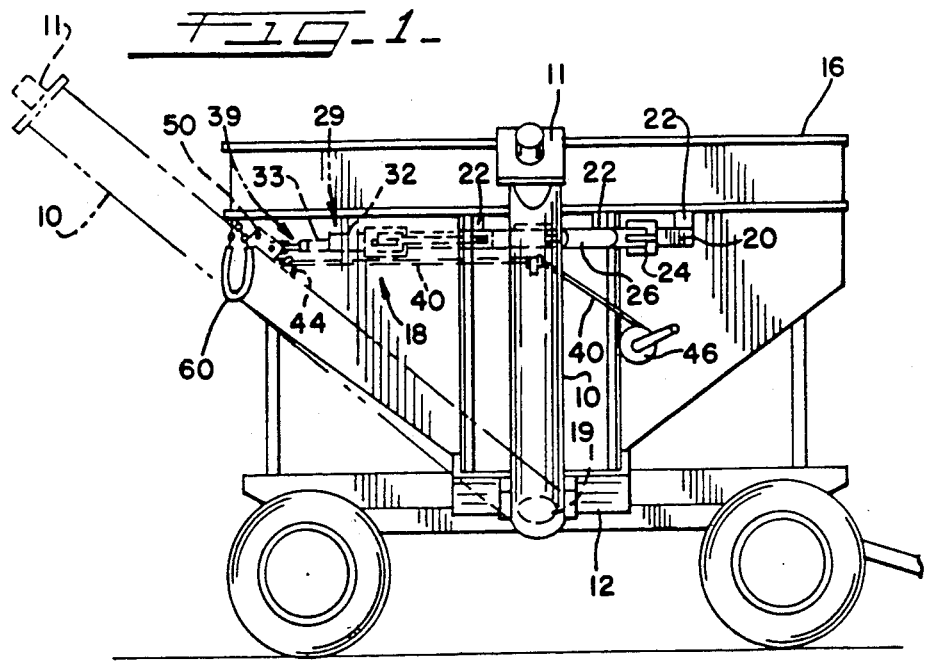
FIG. 1 is a side elevation view of a gravity box of the type having an auger positioning mechanism incorporating the principles of the present invention.

The auger tube 10 is swivelly mounted by a mount 19, as shown in FIGS. 1 and 3, to the wall of hopper 12 also in a manner similar to that shown in my aforementioned patent. This swivel mounting 19 permits the auger tube 10 to swing between its working position as shown in solid and its transport position as shown in dot and dash in FIGS. 1 and 2. Movement between these positions is accomplished by the auger positioning mechanism 18 of the present invention. Because of the weight of large diameter auger tubes, the swivel mounting 19 preferably includes bearings (not shown) for ease of movement and wear reduction.

The auger positioning mechanism 18 includes a support bar 20 mounted by brackets 22 to and slightly spaced from the exterior wall of gravity box 16 above the discharge chute 14. A hydraulic cylinder bracket 24 is mounted on the support bar 20 in off centered relationship to the hopper 12. One end of a hydraulic cylinder 26 is loosely pivotally mounted to the cylinder bracket 24, such as by a pivot pin 27, as viewed in FIG. 2. The piston rod of cylinder 26 is pivotally mounted by a pivot pin 27' to a second cylinder bracket 28 which, in turn, is securely mounted to an adjustable length support arm generally 29 intermediate its length. Although the cylinder 26 and its piston rod are shown mounted respectively to brackets 24 and 28, it will be appreciated that these may be reversed without departing from the invention.

A support arm bracket 30 is also securely mounted to support bar 20, and an eye 30A, which is fixed to the end of the support arm 29 nearest the gravity box, is swivelly mounted, as by pin 31 as shown in FIG. 2, to the bracket 30. The support arm 29 preferably comprises a hollow first section 32 and a second smaller hollow section 33 which telescopes into the first section 32. The length of the support arm 29 thereby may be adjusted to adjust the elevation angle of the auger tube 10, as shown in FIG. 3, by telescoping section 33 into or out of section 32 until two length adjustment holes 34 in section 32 line up with two of the plural length adjustment holes 36 in section 33. When the desired auger tube elevation is realized, a pin 38 is secured through each of the aligned holes to maintain the auger tube 10 at its desired elevation. In order to prevent relative rotation between the two sections 32 and 33, both sections preferably are of non-circular, but similar cross section. It will be understood, however, that the hollow sections can assume a circular cross section without departing from the invention. The end of hollow section 33 is attached to the auger tube 10 by a flexible coupling 39, as best viewed in FIG. 4.

The elevation angle of the auger tube 10 is adjusted by a steel cable 40 which is secured at one end by a hook 42 to an eye 44 on the auger tube 10 as seen in FIG. 4. The cable 40 passes around a pulley 45 as shown in FIG. 3, and the other end of cable 40 extends to a winch 46 mounted on the exterior of the gravity box 14 preferably below the mounting arm 20 and at a height convenient for operation.

Flexible coupling 39 is shown in detail in FIG. 4. It includes a short chain link defining an eye 48, which is welded to a plate 49. The plate 49 is attached to a bracket 50 mounted on auger tube 10. The flexible coupling 39 also includes a shaft 52 which extends into a round tube 54 having an inside diameter large enough to allow free rotation of shaft 52. The tube 54 is fixed within the end of the hollow section 33, such as by welds 55 as shown in FIG. 4. A round stop 56 is fixed to the inner end of shaft 52, such as by welding. The stop 56 is rotatable within section 33 of support arm 29, but is large enough to prevent it from sliding through tube 54. An eye 58 is fixed to the outer end of shaft 52 and the eye 58 is coupled to the eye 48 by a chain link 60 as shown in FIG. 4.

Although it is believed that the operation of the gravity box and auger positioning mechanism of the present invention will be clear to one skilled in the art from the foregoing description, a brief description of the operation follows.

It will first be assumed that the auger tube 10 is in its stored transport position, as shown in dot and dash in FIGS. 1 and 2. In this stored position, the auger tube 10 is preferably supported in some manner, such as by a looped chain sling 60 as shown in FIGS. 1 and 2.

In order to move the auger tube 10 from its stored transport position to its working position, the support sling 60 is undone and hydraulic power is supplied to the cylinder 26 through suitable hydraulic conduits 62 as shown in FIG. 3. This power may be supplied by a hydraulic pump on the chassis of the gravity box 16 itself which is driven from a mechanical power take-off from, for example, a tractor, or it may be supplied directly by conduits from a pump on the tractor. The hydraulic fluid is supplied to the cylinder 26 in a manner so as to cause its piston to move to exert a pulling force on the cylinder bracket 28 and support arm 29.

When the pulling force is exerted upon the support arm 29, it causes the support arm to rotate in a counterclockwise direction, as viewed in FIG. 2, about its swivel loop 30A and pin 31 on bracket 30. Because the support arm 29 is also flexibly coupled by way of the flexible coupling 39 to the auger tube 10, as the support arm rotates it will draw the auger tube 10 along with it.

As the auger tube 10 moves from its transport position to its working position as shown in solid in FIGS. 1 and 2, it will swing out and away from the gravity box 16 and downward. This two dimensional movement is readily accommodated by the auger positioning mechanism of the present invention via its swivel loop 30A attachment, as well as the flexible coupling 39 which accommodates the plural degrees of freedom of movement of the assembly as the auger tube 10 is moved between its transport and working positions. Movement of the auger tube 10 in these plural degrees of movement is made possible by both the pivotal action of the hopper 12 about its pivot 13 as shown in FIG. 3, and the swiveling movement of the auger tube 10 relative to the hopper 12 by virtue of its swivel mounting 19 to the hopper.

When the auger tube 10 has been swung into its working position, it extends outwardly from the gravity box 16 in a vertical plane which is generally perpendicular to the gravity box. The auger tube 10 is shown in its working position in solid in FIGS. 1 and 2.

If it is desired to adjust the elevation angle of the auger tube 10 once it is in its working position, the slack in cable 40 is taken up by operating the winch 46. Once the slack in the cable 40 is taken up, the pins 38, as shown in FIG. 2, are removed from the support arm 29 to allow movement of the hollow sections 32 and 33 of the support arm relative to each other. If it is desired to elevate the auger tube 10, the winch 46 is then operated to draw the auger tube 10 upwardly from its solid position to the dot and dash position, as shown in FIG. 3. Once the auger tube has reached its desired dot and dash elevation angle as shown in FIG. 3, the adjustment holes 36 in hollow section 33 are aligned with the holes 34 in hollow section 32 and the pins 38 are replaced. Thus, the support arm 29 again assumes support of the auger tube 10 in its desired elevational position.

If it is desired to return the auger tube 10 to its transport position as shown in dot and dash in FIGS. 1 and 2, hydraulic power is again supplied to the cylinder 26 through conduit 62, but in the reverse direction. Movement of the auger tube 10 from its working position to its stored position will not be described in detail as it is merely the reverse of the operation previously described for movement from its transport position to its working position.

It will be noted that an important feature of the present invention is the ability of the auger positioning mechanism 18 to accommodate movement in all degrees of freedom and for all elevation angles of the auger tube with freedom and flexibility. This is advantageous in that movement of the auger tube 10 between its working and transport positions does not require either the disassembly of any parts or the return of the auger tube 10 to some prescribed elevation angle. Thus, all that need be done to accomplish movement between these positions is to energize the hydraulic cylinder 26 in the appropriate direction.

The flexibility of movement of the auger positioning mechanism 18 is made possible both by the swivel loop 30A connection of the support arm 29 to the gravity box, as well as the flexible coupling 39 between the support arm 29 and the auger tube 10. These flexible couplings permit ease of relative movement between the support arm 29, the gravity box 16 and the auger tube 10, even though the elevation of the support arm may widely vary with the elevation angle of the auger tube and during the course of movement between the working and transport positions.

It will be understood that the embodiment of the present invention which has been described herein is merely illustrative of an application of the principles of the invention. Numerous modifications may be made by those skilled in the art without departing from the spirit and scope of the invention.

What is claimed is:

1. An auger positioning mechanism for swinging a material conveying auger between two positions, including mounting means for mounting the auger to a material storage container to permit both pivotal and swivelable movement of the auger relative to the container, said mechanism comprising:
   support means for supporting the auger at an elevation angle relative to the container and in one of the two positions, said support means comprising an elongate member and first and second coupling means swivelably coupling said elongate member to the container and said auger, respectively; and
   powered urging means pivotally coupled between the container and said elongate member for swinging said auger with both said pivotal and swivelable movement between said two positions, said first and second coupling means permitting swivelable movement of said elongate member relative to both the container and said auger as said auger is swinging between said two positions.

2. The mechanism of claim 1, wherein said second coupling means comprise means rotatable relative to said elongate member, and link means coupling said rotatable means to said auger, said rotatable menas and link means permitting swivelable movement of said elongate member relative to said auger.

3. The mechanism of claim 1, including said container in combination therewith, said container comprising a gravity box.

4. The mechanism of claim 1, wherein said powered urging means comprises a hydraulic cylinder.

5. The mechanism of claim 4, including said container in combination therewith, said container comprising a gravity box.

6. The mechanism of claim 1, wherein said elongate member includes means for varying the length of said member.

7. The mechanism of claim 6, including elevation adjustment means for adjusting the elevation angle of said auger when said auger is in one of said two positions.

8. The mechanism of claim 7, including said container in combination therewith, said container comprising a gravity box.

9. The mechanism of claim 1, wherein said elongate member comprises a pair of sections which are telescopically positioned relative to each other to vary the length of said elongate member.

10. The mechanism of claim 9, including elevation adjustment means for adjusting the elevation angle of said auger when said auger is in one of said two positions.

11. The mechanism of claim 10, including said container in combination therewith, said container comprising a gravity box.

12. The mechanism of claim 1, wherein said first coupling means comprise eye means on one end of said elongate member and pin means on the container extending through said eye means to permit swivelable movement of said elongate member relative to the container.

13. The mechanism of claim 12, wherein said second coupling means comprise means rotatable relative to said elongate member, and link means coupling said rotatable means to said auger, said rotatable means and link means permitting swivelable movement of said elongate member relative to said auger.

14. The mechanism of claim 13, including said container in combination therewith, said container comprising a gravity box.

15. An auger positioning mechanism for swinging a material conveying auger between two positions, including mounting means for mounting the auger to a material storage container to permit both pivotal and swivelable movement of the auger relative to the container, said mechanism comprising:
   support means for supporting the auger at an elevation angle realtive to the container and in one of the two positions, said support means comprising an elongate member including means for varying the length of said member, and first and second coupling means swivelably coupling said elongate member to the container and said auger, respectively;
   powered urging means pivotally coupled between the container and said elongate member for swinging said auger between said two positions, said first and second coupling means permitting swivelable movement of said elongate member relative to both the container and said auger as said auger is swinging between said two positions; and
   elevation adjustment means for adjusting the elevation angle of said auger when said auger is in one of said two positions.

16. The mechanism of claim 15, including said container in combination therewith, said container comprising a gravity box.

17. An auger positioning mechanism for swinging a material conveying auger between two positons, including mounting means for mounting the auger to a material storage container to permit both pivotal and swivelable movement of the auger relative to the container, said mechanism comprising:
   support means for supporting the auger at an elevation angle relative to the container and in one of the two positions, said support means comprising an elongate member having a pair of sections which are telescopically positioned relative to each other to vary the length of said elongate member, said first and second coupling means swivelably coupling said elongate member to the container and said auger, respectively;
   powered urging means pivotally coupled between the container and said elongate member for winging said auger between said two positions, said first and second coupling means permitting swivelable movement of said elongate member relative to both the container and said auger as said auger is swinging between said two positions; and
   elevation adjustment means for adjusting the elevation angle of said auger when said auger is in one of said two positions.

18. The mechanism of claim 17, including said container in combination therewith, said container comprising a gravity box.

* * * * *